United States Patent
Griffiths

(10) Patent No.: US 8,720,482 B2
(45) Date of Patent: May 13, 2014

(54) FUEL SYSTEM

(75) Inventor: Michael Griffiths, Bromsgrove (GB)

(73) Assignee: Rolls-Royce Engine Control Systems Limited, Derby (GB)

(*) Notice: Subject to any disclaimer, the term of this patent is extended or adjusted under 35 U.S.C. 154(b) by 237 days.

(21) Appl. No.: 12/843,342

(22) Filed: Jul. 26, 2010

(65) Prior Publication Data

US 2011/0023982 A1 Feb. 3, 2011

(30) Foreign Application Priority Data

Jul. 28, 2009 (GB) .................................. 0913097.2

(51) Int. Cl.
*F16K 31/124* (2006.01)

(52) U.S. Cl.
USPC ............... 137/489.5; 137/492.5; 137/495; 137/565.14; 60/39.281

(58) Field of Classification Search
USPC ......... 137/489.5, 492.5, 495, 565.14; 60/734, 60/39.281
See application file for complete search history.

(56) References Cited

U.S. PATENT DOCUMENTS

| | | | |
|---|---|---|---|
| 4,449,548 A * | 5/1984 | Tutherly | 137/468 |
| 6,176,076 B1 | 1/2001 | Ford | |
| 6,321,527 B1 | 11/2001 | Dyer et al. | |
| 6,651,442 B2 * | 11/2003 | Davies et al. | 60/773 |
| 6,666,014 B2 | 12/2003 | Maillard et al. | |
| 7,096,658 B2 * | 8/2006 | Wernberg et al. | 60/39.281 |
| 7,234,293 B2 | 6/2007 | Yates et al. | |
| 7,735,513 B2 * | 6/2010 | Bush | 137/489.5 |

FOREIGN PATENT DOCUMENTS

| | | |
|---|---|---|
| EP | 1903416 | 3/2008 |
| EP | 1944486 | 7/2008 |
| GB | 2305975 | 4/1997 |

OTHER PUBLICATIONS

European Search Report for Application No. 10 251 310.8 dated Apr. 25, 2012.

* cited by examiner

*Primary Examiner* — William McCalister
(74) *Attorney, Agent, or Firm* — Oliff, PLC

(57) ABSTRACT

A fuel metering unit (FMU) comprising a metering valve operable to control the supply of fuel to a delivery chamber of a pressure raising valve (PRV), the PRV including a valve member movable under the influence of the pressure within the delivery chamber between a closed position and an open position in which fuel is able to flow from the delivery chamber to an outlet port, and a push piston movable under the influence of the pressure within a control chamber to urge the valve member towards its open position, wherein the control chamber communicates with a valve control port.

6 Claims, 2 Drawing Sheets

FUEL SYSTEM

Figure 1:
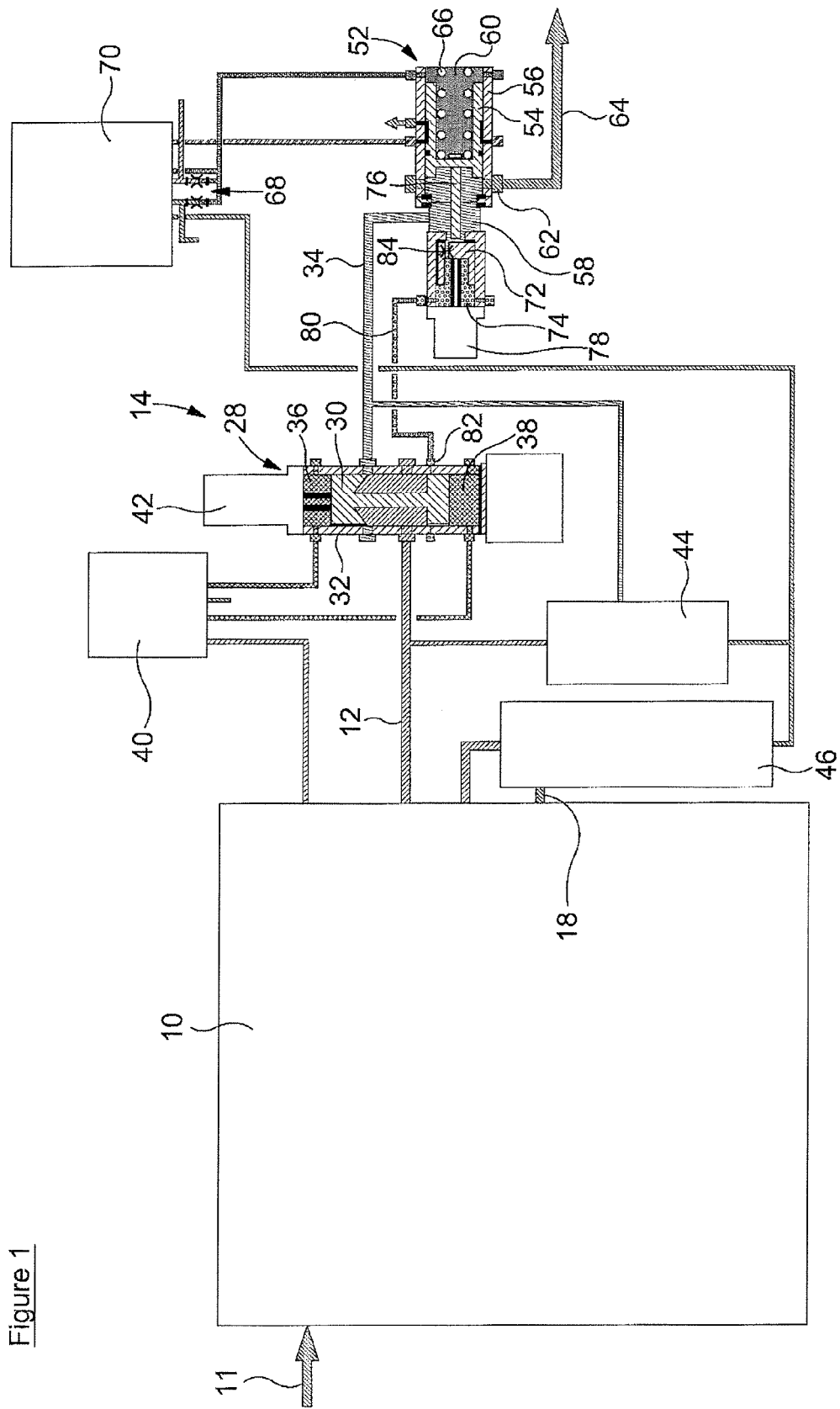

This invention relates to a fuel system and in particular to a fuel system suitable for use in aerospace applications.

A typical fuel system for use in such applications includes a pumping arrangement from which fuel is supplied at high pressure to a fuel metering unit (FMU). The FMU includes a metering valve operable to control the rate of fuel supply to an engine burner manifold. A pressure drop control valve (PDCV) monitors the drop in fuel pressure across the metering valve and controls the operation of a spill valve to maintain the pressure drop at a substantially fixed level.

A pressure raising valve (PRV) is provided between the metering valve and the burner manifold, and operates to assist in maintaining the fuel pressure within the fuel system at a level above a predetermined minimum level, typically of the order of 200 to 300 psid above the minimum level, to ensure the correct operation of fuel-draulic devices, for example variable inlet guide vane actuators, which receive fuel from the FMU.

The pumping arrangement is typically driven, via a gear box, by the engine. Consequently, the rate at which fuel is supplied by the pumping arrangement to the FMU is dependent upon engine speed. Although at normal engine operating speeds the pumping arrangement is able to supply sufficient fuel to the FMU, when the engine is turning only at low speed, for example under windmill relight conditions where the engine speed may be as low as 5% of its normal maximum operating speed, parasitic leakage losses within the pumping arrangement and the FMU may be significantly large that the pumping arrangement is unable to deliver the fuel flow required to start the engine.

A number of techniques are known for use in ensuring that the pumping arrangement can deliver sufficient fuel flow to the engine burner manifold in such circumstances. Typically these techniques involve reducing the system pressure rise at start in order to reduce the parasitic losses within the pumping arrangement and the FMU, thereby ensuring that there is adequate fuel flow available to start the engine. For example, U.S. Pat. Nos. 6,666,014, 6,176,076 and 6,321,527 all describe arrangements whereby the pressure applied to the control chamber of the PRV, urging the PRV towards a closed position can be switched between a normal operating level whereby the PRV operates to ensure that the system pressure is held at or above a predetermined level sufficient to ensure correct operation of fuel-draulic devices, and a reduced level at which the PRV opens at reduced system pressures to ensure that parasitic leakages are reduced sufficiently to allow the pump to deliver the required fuel flow to the engine. It will be appreciated that although such arrangements ensure that the required fuel flow is delivered to the engine under windmill relight conditions, they are relatively complex, and could adversely affect the operation of the PRV under other operating conditions, for example during shut down.

U.S. Pat. No. 7,234,293 describes an arrangement in which the PRV incorporates a push piston, movement of the push piston assisting in moving the PRV to its open position. The push piston is supplied with fuel under pressure from the larger gear pump of a twin gear pump arrangement. When operating under low speed conditions, both pumps will be loaded, thus high pressure fuel is applied to the push piston to open the PRV. At higher operating speeds, the larger pump is normally unloaded thus the pressure applied to the push piston is reduced. Such an arrangement is only suitable for use with twin gear pump systems. Further, under other operating conditions the dynamic performance of the system may be adversely affected.

It is an object of the invention to provide a fuel system in which at least some of the disadvantages of the prior arrangements are overcome or are of reduced effect.

According to the present invention there is provided a fuel metering unit (FMU) comprising a metering valve operable to control the supply of fuel to a delivery chamber of a pressure raising valve (PRV), the PRV including a valve member movable under the influence of the pressure within the delivery chamber between a closed position and an open position in which fuel is able to flow from the delivery chamber to an outlet port, and a push piston movable under the influence of the pressure within a control chamber to urge the valve member towards its open position, wherein the control chamber communicates with a valve control port, such that the pressure within the control chamber is dependent, in part, upon whether the valve control port is open or closed.

The valve control port may be provided on the metering valve. Alternatively, it may be provided on, for example, a pressure drop control valve (PDCV). The location of the valve control port may depend upon, for example, the nature of the FMU.

Preferably, where the valve control port is provided upon the metering valve, it is arranged to be open when the metering valve occupies an engine start zero fuel flow delivery position.

Such an arrangement is advantageous in that the valve member of the PRV can be urged towards an open position in a windmill relight condition in a reliable manner. The FMU can be used with a range of designs of pumping arrangement. For example it can be used with single and twin gear pump arrangements or with single or twin vane pump arrangements, or combinations thereof. As the metering valve or spill valve is used to control the pressure applied to the control chamber, it will be appreciated that the addition of extra components is avoided, thus the FMU is relatively simple.

Where the pumping arrangement uses fixed displacement gear pumps, then a valve control port provided in the metering valve is preferably used to control the pressure applied to the control chamber. Where the pumping arrangement includes a variable displacement pump such as a vane pump, and a pressure drop control valve (PDCV) is used to control the operation of this variable displacement pump, a valve control port provided in the PDCV may be used to control the pressure applied to the control chamber.

Preferably a restricted flow passage provides a restricted flow path between the control chamber and the delivery chamber, thus permitting return movement of the push piston when the valve control port is closed.

Figure 2:
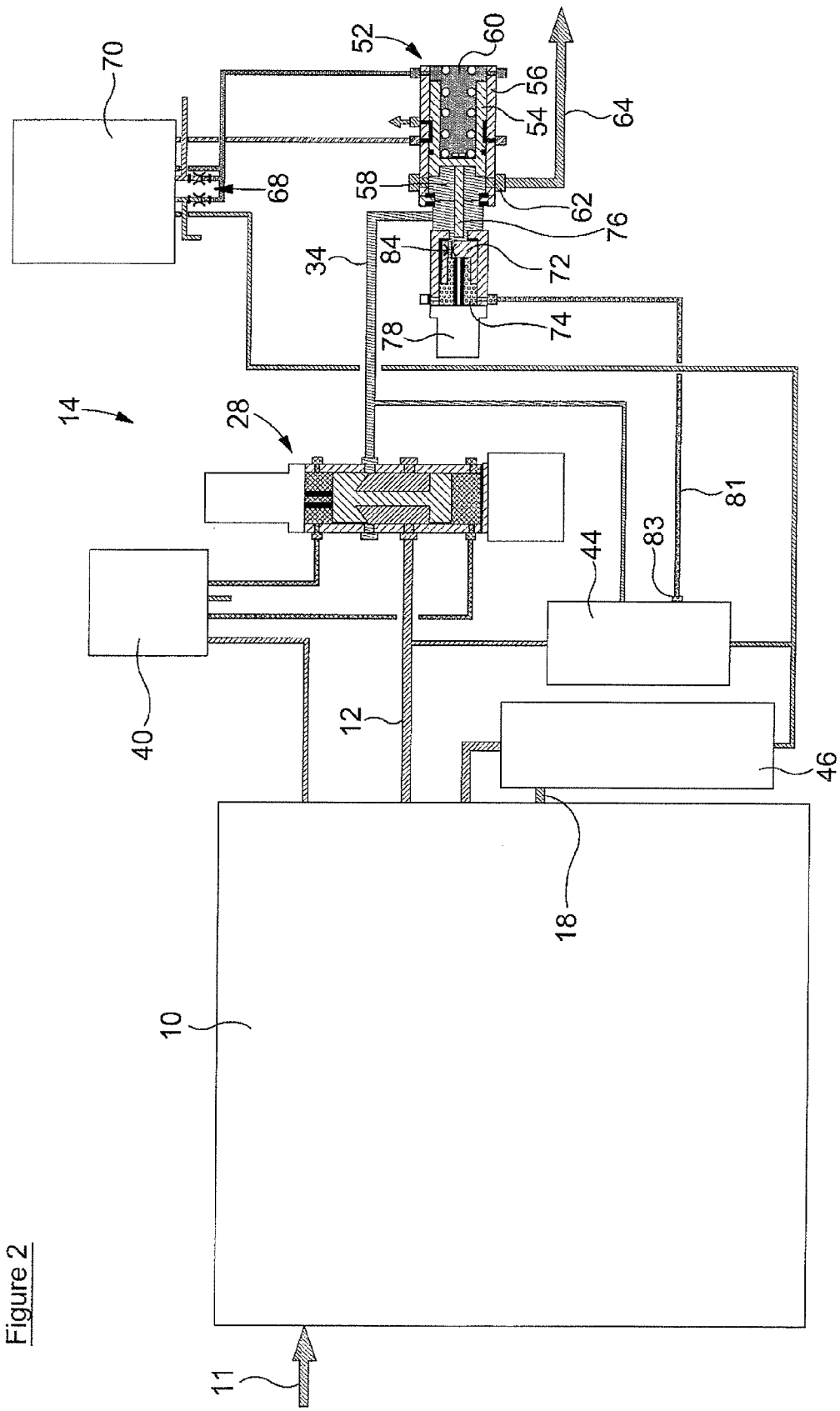

The invention will further be described, by way of example, with reference to the accompanying drawings, in which:

FIG. 1 is a schematic view illustrating a fuel system in accordance with one embodiment of the invention; and FIG. 2 is a view similar to FIG. 1 illustrating an alternative embodiment.

The fuel system illustrated in FIG. 1 comprises a pumping unit 10 arranged to supply fuel from a tank line 11 to a supply line 12 of a fuel metering unit (FMU) 14 under high pressure. The precise nature of the pumping unit 10 is not of relevance to the invention, and may be selected from a range of suitable pumping units that are well known to those skilled in the art, and will not be described in detail, other than to note that it comprises an arrangement of low pressure and high pressure pumping elements, along with any necessary switching and relief valve elements.

Within the FMU 14 is located a metering valve 28. The metering valve 28 comprises a valve member 30 movable within a bore formed in a housing 32, the position of the valve member 30 within the housing 32 controlling the supply of fuel from the supply line 12 through the metering valve 28 to a delivery line 34. The position occupied by the valve member 30 is controlled by controlling the fuel pressures applied to chambers 36, 38 located at each end of the valve member 30. A servo valve 40 is used to control these pressures and thereby controls the position occupied by the valve member 30. An LVDT or other position sensor 42 monitors the position occupied by the valve member 30 and provides this information to a control unit (not shown) which controls the operation of the servo valve 40. It will thus be appreciated that the metering valve 28 can be controlled in a closed loop manner.

A pressure drop control valve (PDCV) 44 is connected between the supply line 12 and delivery line 34 and is operable to control the operation of a spill valve 46. The PDCV 44 controls the operation of the spill valve 46 in such a manner as to maintain a substantially uniform pressure drop across the metering valve 28. For example, the pressure drop is typically within the range 75 to 125 psid. If the pressure drop across the metering valve 28 increases above a desired maximum level, then the PDCV 44 causes the spill valve 46 to move to a position in which there is an increase in the volume of fuel flowing through the spill valve 46 from the supply line 12 to a low pressure line 18. It will be appreciated that such an increase in fuel flow through the spill valve 46 reduces the fuel pressure within the supply line 12, and thus reduces the pressure drop across the metering valve 28. If the pressure drop across the metering valve 28 decreases below a desired minimum level, then the PDCV 44 causes the spill valve 46 to move to a position in which there is a decrease in the volume of fuel flowing through the spill valve 46 from the supply line 12 to the low pressure line 18. It will be appreciated that such a decrease in fuel flow through the spill valve 46 increases the fuel pressure within the supply line 12, and thus increases the pressure drop across the metering valve 28.

The delivery line 34 is connected to a pressure raising valve in the form of a pressure raising and shut-off valve (PRSOV) 52 which serves, in use, to assist in maintaining the fuel pressure within the FMU 14 at above a predetermined minimum pressure, and is also used in controlling the termination of fuel supply to the burner manifold of the associated engine when the engine is to be shut down. The PRSOV 52 comprises a valve member 54 slidable within a housing 56, and defining with the housing 56 a delivery chamber 58 and a second chamber 60. The delivery line 34 communicates with the delivery chamber 58, and the position occupied by the valve member 54 determines whether or not an outlet port 62 also communicates with the delivery chamber 58, and thus controls the delivery of fuel along a line 64 to the burner manifold. The valve member 54 is urged towards a closed position in which the outlet port 62 is closed by means of a spring 66 and by means of the fuel pressure within the second chamber 60 which is set by a fuel pressure potentiometer network 68, in normal use, and which can be set to a high pressure by a shut-off servo valve 70 when engine shut down is desired.

The PRSOV 52 further includes, at an opposite end of the housing 56 to the valve member 54, an equal area push-piston 72 movable under the influence of the fuel pressure within a control chamber 74 defined between the push-piston 72 and the housing 56, the push-piston 72 being arranged such that when the valve member 54 occupies its closed position, movement of the push-piston 72 from its left hand most position towards the right hand most position, as viewed in FIG. 1, results in the push-piston 72 urging the valve member 54 towards its open position, the movement of the push-piston 72 being transmitted to the valve member 54 by means of a push-rod 76 extending across the delivery chamber 58. It is recognised that the push-rod 76 can form part of the structure of either the valve member 54 or the push-piston 72. In the embodiment described herein it preferably forms part of the structure of the valve member 54. A position sensor 78 monitors the position of the push-piston 72. Conveniently, the position sensor 78 comprises an inductive probe, but it will be appreciated that this need not always be the case.

The control chamber 74 is connected via a control line 80 to a valve control port 82 provided on a valve of the FMU, in this case the metering valve 28, with the result that the fuel pressure applied to the control chamber 74 is controlled by the operation of the metering valve 28.

The push-piston 72 is provided with a restricted flow passage 84 defining a restricted flow path between the control chamber 74 and the delivery chamber 58.

In normal use, as illustrated, the metering valve 28 operates to control the rate at which fuel is delivered to the engine manifold by controlling the rate at which fuel flows from the supply line 12 to the delivery line 34, the PDCV 44 and spill valve 46 ensuring that a substantially uniform pressure drop is maintained across the metering valve 28. Under these conditions, the fuel pressure within the delivery chamber 58 of the PRSOV 52 is sufficient to ensure that the valve member 54 occupies its open position, the fuel pressure within the delivery chamber 58 being sufficient to hold the valve member 54 against the action of the spring 66 and fuel pressure within the second chamber 60. Fuel is thus able to flow from the delivery chamber 58 through the outlet port 62 and along the line 64 to the burner manifold. It will be appreciated that in this mode of operation the spring 66 and fuel pressure within the second chamber 60 as set by the potentiometer network 68 serve to control the operation of the PRSOV 52 to ensure that the required minimum system pressure is maintained.

In this mode of operation the valve member 30 obscures the control port 82, and so high pressure fuel is not supplied directly from the supply line 12 to the control chamber 74 via control port 82 and line 80, and the push-piston 72 is inactive.

Prior to engine start-up the metering valve 28 will occupy a closed or zero fuel flow position in which no fuel is delivered from the supply line 12 to the delivery line 34. The fuel pressure within the delivery chamber 58 will thus be low, and the valve member 54 will occupy its closed position, the spring 66 holding the valve member 54 in this position. With the metering valve 28 in this position, the control port 82 is open, and thus the control chamber 74 will be at substantially the same pressure as the supply line 12.

When engine start-up is initiated, for example in a windmill relight condition, the rotation of the engine and consequent operation of the pumping unit 10 will result in the fuel pressure within the supply line 12 increasing. As the pressure in the supply line 12 increases there is sufficient pressure available at the servo valve 40 to ensure that its operation results in movement of the metering valve member 30 via the pressures applied to the chambers 36, 38. At start-up the metering valve 28 is commanded by the control unit (not shown) to move from its closed position to an open position via the servo-valve 40 increasing the pressure in chamber 38 relative to the pressure in chamber 36.

As the metering valve member 30 moves to an open position, the fuel pressure in the delivery line 34 and hence the delivery chamber 58 increases, resulting in the PRSOV valve member 54 moving against the action of the spring 66 and the fuel pressure within the second chamber 60 from a closed to an open position.

As a consequence of the resulting fuel flow through the metering valve 28 and PRSOV 52 to the engine burners, due to the respective valve members 30, 54 being moved from closed to open positions, a pressure drop develops across the metering valve such that the pressure in the delivery chamber 58 is less than the pressure in the supply line 12.

Furthermore, as the pressure in the supply line 12 increases at start-up, the pressure within the control chamber 74 also increases by virtue of the fact that the control port 82 is open. During the initial opening of the metering valve 28, when fuel starts to be delivered to the engine burners, the control port 82 remains open. In this condition, the fuel pressure in the control chamber 74, which is substantially the same as that in the supply line 12, is greater than the fuel pressure in the delivery chamber 58, by virtue of the pressure drop across the metering valve 28.

As a consequence of this difference in pressure between the control chamber 74 and the delivery chamber 58, the push-piston 72 is able to move under the action of the pressure within the control chamber 74 to the right in the orientation illustrated. The movement of the push-piston 72 results in co-operation between the push-piston 72 and the push-rod 76, and thus the movement of the push-piston 72 will also result in further opening movement of the valve member 54 against the action of the spring 66 and fuel pressure within the second chamber 60.

In this mode of operation it will be appreciated that the operation of the push-piston 72 to open the PRSOV 52 results in the minimum system pressure rise being reduced, for example to less than approximately 150 psid. With this reduced minimum system pressure rise, parasitic leakage losses in the system are reduced and hence the majority of the fuel displaced by the pumping unit 10 is delivered to the engine burners thus enabling the engine to be re-started at a windmill relight condition when the engine speed is as low as, for example, 5% of maximum speed.

Once the engine has re-started, the metering valve 28 is controlled in such a manner as to increase the rate of fuel supply to the delivery line 34, thus increasing the rate of fuel supply to the engine burners. Such operation of the metering valve 28 will result in the control port 82 being closed by virtue of the valve member 30 of the metering valve 28 further moving in an upwards direction as illustrated in FIG. 1, thus breaking the direct connection between the fuel pressure within the control chamber 74 and the fuel pressure within the supply line 12. With the connection between the control chamber 74 and the supply line 12 broken, the fuel pressure within the control chamber 74 becomes substantially equal to the fuel pressure in the delivery chamber 58 by virtue of the restricted passage 84 in the push-piston 72. At this condition the push-piston 72 remains in a static equalised right-most position, as illustrated in FIG. 1, no longer acting on the PRSOV push-rod 76. As the engine operating speed, and hence the operating speed of the pumping unit 10 increases, the fuel pressure within the supply line 12 will increase resulting, in turn, in an increase in the fuel pressure within the delivery chamber 58, which acts independently of the push-piston 72 on the PRSOV valve member 54 urging it towards its fully open position. It will be appreciated that as the push-piston 72 is no longer acting on the PRSOV valve member 54 via the push-rod 76, the PRSOV 52 operates as normal to maintain a minimum fuel pressure within the system that is sufficient to ensure correct operation of the fuel-draulic devices at all engine operating conditions apart from start-up (i.e. engine idle). Also, operation of the PRSOV 52 to permit subsequent engine shut-down, when so desired, is re-established.

To shut down the engine, the shut-off servo valve 70 is operated to raise the pressure within the second chamber 60 to a level sufficient to force the valve member 54 to its fully closed position, thereby terminating fuel flow to the burner manifold. The movement of the valve member 54 is transmitted to the push-piston 72 by the push rod 76, thereby forcing the push-piston 72 to return to its left-most position. The restricted passage 84 in the push-piston 72 ensures that when, at shut-down, the position of the metering valve 28 is such that the control port 82 is closed, trapped fuel in the control chamber 74 is allowed to escape to the delivery chamber 58 as the push-piston 72 is forced to the left-most position by the PRSOV valve member 54 via the push-rod 76.

It will be appreciated that the arrangement of the invention has a number of advantages. For example, the use of the metering valve to control the operation of the push-piston means that the push-piston only acts on the PRSOV valve member during start-up, and not idle or cruise, conditions. The reduction in system pressure thus only occurs during start-up, when there is no requirement to operate fuel-draulic devices. The system can also be used with a wide range of pumping units, for example single and twin gear pump arrangements, single and twin vane pump arrangements, and combinations thereof. Furthermore, the dynamic stability problems of prior arrangements where the push-piston is controlled using the output of one of a pair of gear pumps are overcome, and issues arising from movement of the push-piston during, for example, idle descent conditions are negated.

In an alternative embodiment of the invention, as illustrated in FIG. 2, the PDCV 44 is used instead of the metering valve 28 to control the operation of the push-piston 72. In this arrangement, the valve control port 83 is provided on the PDCV 44 and is connected to the control chamber 74 by a control line 81 with the result that the fuel pressure applied to the control chamber 74, and hence the operation of the push-piston 72, is controlled by the operation of the PDCV 44. The design of the PDCV 44 is such that the PDCV 44 can be moved to a position in which the fuel pressure applied to the control line 81, and hence that applied to the control chamber 74, is substantially equal to that within the supply line 12 to achieve the benefits described hereinbefore.

It will be appreciated that, other than as described above, the arrangement of FIG. 2 is very similar to that of FIG. 1 and so a detailed description of the operation thereof is not set out herein, other than to note that much of the description hereinbefore relating to the arrangement of FIG. 1 is also applicable to the arrangement of FIG. 2.

This alternative embodiment of the invention is particularly applicable to fuel systems where the pumping unit 10 incorporates a variable displacement vane pump (VDVP) and the PDCV 44 is used to control the operation of the VDVP. However, the invention is not restricted to use in such an arrangement.

A number of other modifications or alterations may be made without departing from the scope of the invention.

The invention claimed is:

1. A fuel metering unit (FMU) comprising a metering valve having a metering valve member, further comprising a pressure raising valve (PRV) which has a delivery chamber to which the metering valve controls a supply of fuel, the PRV including a PRV valve member movable under the influence of the pressure within the delivery chamber between a closed position and an open position in which fuel is able to flow from the delivery chamber to an outlet port, and a push piston movable under the influence of the pressure within a control chamber to urge the PRY valve member towards its open position, wherein the control chamber communicates with a valve control port, such that the pressure within the control chamber is dependent, in part, upon whether the valve control port is open or closed, wherein the valve control port is provided on the metering valve, the valve control port being closable by the metering valve member and being arranged to be open when the metering valve occupies an engine start zero fuel flow delivery position.

2. A unit according to claim 1, wherein the FMU includes a pumping unit of single or twin gear pump form or of single or twin vane pump form.

3. A unit according to claim 1, wherein the push-piston includes a face exposed to the fuel pressure within the control chamber and a face exposed to the fuel pressure within the delivery chamber.

4. A unit according to claim 3, further comprising a restricted flow passage provided between the control chamber and the delivery chamber to permit return movement of the push piston when the valve control port is closed.

5. A unit according to claim 4 wherein the restricted flow passage extends through the push-piston.

6. A unit according to claim 1, wherein use of the metering valve to control operation of the push piston translates to the push piston only acting on the PRV valve during start-up and not during an idle or cruise condition.

\* \* \* \* \*